United States Patent
Aoki et al.

(10) Patent No.: US 7,420,761 B2
(45) Date of Patent: Sep. 2, 2008

(54) CONTROL APPARATUS, STORAGE DEVICE, AND HEAD RETRACTION CONTROLLING METHOD

(75) Inventors: Takahiro Aoki, Kawasaki (JP); Takeshi Hara, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 173 days.

(21) Appl. No.: 11/586,939

(22) Filed: Oct. 26, 2006

(65) Prior Publication Data

US 2007/0291396 A1 Dec. 20, 2007

(30) Foreign Application Priority Data

Jun. 15, 2006 (JP) .............................. 2006-166613

(51) Int. Cl.
*G11B 21/02* (2006.01)
(52) U.S. Cl. ....................................................... 360/75
(58) Field of Classification Search .................. 360/75, 360/77.02, 69, 78.04
See application file for complete search history.

(56) References Cited

U.S. PATENT DOCUMENTS

| | | | |
|---|---|---|---|
| 6,771,449 B1 | 8/2004 | Ito et al. | |
| 6,995,939 B2 | 2/2006 | Ito et al. | |
| 7,324,298 B2 * | 1/2008 | Ando | 360/75 |
| 2002/0021513 A1 | 2/2002 | Kaneko et al. | |
| 2007/0086108 A1 * | 4/2007 | Kuroki et al. | 360/75 |
| 2007/0159710 A1 * | 7/2007 | Lucas et al. | 360/75 |
| 2007/0291392 A1 * | 12/2007 | Aoki et al. | 360/75 |

FOREIGN PATENT DOCUMENTS

| | | |
|---|---|---|
| JP | 2001-307409 | 11/2001 |
| JP | 2002-8336 | 1/2002 |
| JP | 2002-208239 | 7/2002 |

* cited by examiner

*Primary Examiner*—Fred Tzeng
(74) *Attorney, Agent, or Firm*—Greer, Burns & Crain, Ltd.

(57) ABSTRACT

A falling-time measuring unit measures time for which a fall of a storage device is consecutively detected by a fall detecting sensor. A head-position detecting unit detects a position of the head on a storage medium at a time of starting measuring the time. A moving-time calculating unit calculates necessary time for moving the head from the detected position to a destination position. A first-threshold determining unit determines whether the measured time exceeds a threshold calculated by a threshold calculating unit. A head-movement processing unit moves the head to the destination position when it is determined that the measured time exceeds the first threshold.

12 Claims, 7 Drawing Sheets

FIG.3

DETERMINATION-TIME DATA
200b

| FIRST SLICE DETECTING TIME (ms) | SECOND SLICE DETECTING TIME (ms) |
|---|---|
| (VARIABLE VALUE) | 100 |

FIG.6

DETERMINATION-TIME DATA
⎧200b

| FIRST SLICE DETECTING TIME (ms) | SECOND SLICE DETECTING TIME (ms) | THIRD SLICE DETECTING TIME (ms) |
|---|---|---|
| (VARIABLE VALUE) | 95 | 100 |

CONTROL APPARATUS, STORAGE DEVICE, AND HEAD RETRACTION CONTROLLING METHOD

BACKGROUND OF THE INVENTION

1. Field of the Invention

The present invention relates to a technology for moving a head on a storage medium to a predetermined destination position for retracting the head when a fall sensor detects a fall of a storage device.

2. Description of the Related Art

Recently, storage devices such as a magnetic disk drive are used as storage units of information terminal devices in many cases. For example, portable personal computers called laptop computers are widely used, and downsized magnetic disk drives are mounted on the laptop computers.

The magnetic disk drive is further downsized and is even mounted on a portable music reproducing device or a cellular phone. This is because the recording capacity of the magnetic disk drive is relatively large and the reading speed of recorded information has improved, and therefore the magnetic disk drive can be a relatively inexpensive high-performance storage unit.

Being portable, a laptop computer, a portable music reproducing device, and a cellular phone have a high probability of receiving shocks of falls. Meanwhile, the magnetic disk drive is very easily affected by the shocks of falls. For example, if a magnetic disk drive receives a shock when the magnetic head is reading and writing at the surface of the magnetic disk, the magnetic head may damage the surface of the magnetic disk. A problem of how to suppress damages of the magnetic disk due to falls arises when the magnetic disk drive is mounted on an information terminal device.

To avoid this problem, for example, Japanese Patent Application Laid-open No. 2002-8336 discloses a magnetic disk drive having a retraction mechanism that retracts a magnetic head from a magnetic disk surface when a fall detecting sensor detects a fall. The magnetic disk of this magnetic disk drive can avoid the magnetic head from physically damaging the magnetic disk upon falls.

However, conventional arts represented by Japanese Patent Application Laid-open No. 2002-8336 may significantly reduce efficiency of reading and writing processes of the magnetic disk since the conventional arts immediately retracts the magnetic head from the magnetic disk surface when a fall is detected and a retraction process is conducted even when a minor vibration is erroneously detected as a fall, therefore the magnetic head is frequently retracted from the magnetic disk surface.

SUMMARY OF THE INVENTION

It is an object of the present invention to at least partially solve the problems in the conventional technology.

A control apparatus according to one aspect of the present invention is for a storage device that moves a head located on a storage medium surface to a predetermined destination position for a retracting the head when a fall detecting sensor detects a fall of the storage device. The control apparatus includes a falling-time measuring unit that measures time for which the fall of the storage device is consecutively detected by the fall detecting sensor; a head-position detecting unit that detects a position of the head on the storage medium when the falling-time measuring unit starts measuring the time for which the fall of the storage device is consecutively detected; a moving-time calculating unit that calculates necessary time for moving the head from the detected position of the head to a first destination position; a threshold calculating unit that calculates a first threshold based on the calculated necessary time; a first-threshold determining unit that determines whether the measured time is equal to or greater than the calculated first threshold; and a head-movement processing unit that moves the head to the first destination position when the first-threshold determining unit determines that the measured time is equal to or greater than the first threshold.

A storage device according to another aspect of the present invention moves a head located on a storage medium surface to a predetermined destination position for a retracting the head when a fall detecting sensor detects a fall of the storage device. The storage device includes a falling-time measuring unit that measures time for which the fall of the storage device is consecutively detected by the fall detecting sensor; a head-position detecting unit that detects a position of the head on the storage medium when the falling-time measuring unit starts measuring the time for which the fall of the storage device is consecutively detected; a moving-time calculating unit that calculates necessary time for moving the head from the detected position of the head to a first destination position; a threshold calculating unit that calculates a first threshold based on the calculated necessary time; a first-threshold determining unit that determines whether the measured time is equal to or greater than the calculated first threshold; and a head-movement processing unit that moves the head to the first destination position when the first-threshold determining unit determines that the measured time is equal to or greater than the first threshold.

A head-retraction control method according to still another aspect of the present invention is for a storage device that moves a head located on a storage medium surface to a predetermined destination position for a retracting the head when a fall detecting sensor detects a fall of the storage device. The head-retraction control method includes measuring time for which the fall of the storage device is consecutively detected by the fall detecting sensor; detecting a position of the head on the storage medium when the measuring is started; calculating necessary time for moving the head from the detected position of the head to the destination position; calculating a first threshold based on the calculated necessary time; determining whether the measured time is equal to or greater than the calculated first threshold; and moving the head to the destination position when it is determined that the measured time is equal to or greater than the first threshold.

A computer program product according to still another aspect of the present invention includes a computer usable medium having computer readable program codes embodied in the medium that when executed cause a computer to execute measuring time for which the fall of the storage device is consecutively detected by the fall detecting sensor; detecting a position of the head on the storage medium when the measuring is started; calculating necessary time for moving the head from the detected position of the head to the destination position; calculating a first threshold based on the calculated necessary time; determining whether the measured time is equal to or greater than the calculated first threshold; and moving the head to the destination position when it is determined that the measured time is equal to or greater than the first threshold.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic diagram of an example of determination-time data according to the first embodiment;

FIG. 6 is a schematic diagram of an example of determination-time data according to the second embodiment.

DETAILED DESCRIPTION OF THE PREFERRED EMBODIMENTS

Figure 1:
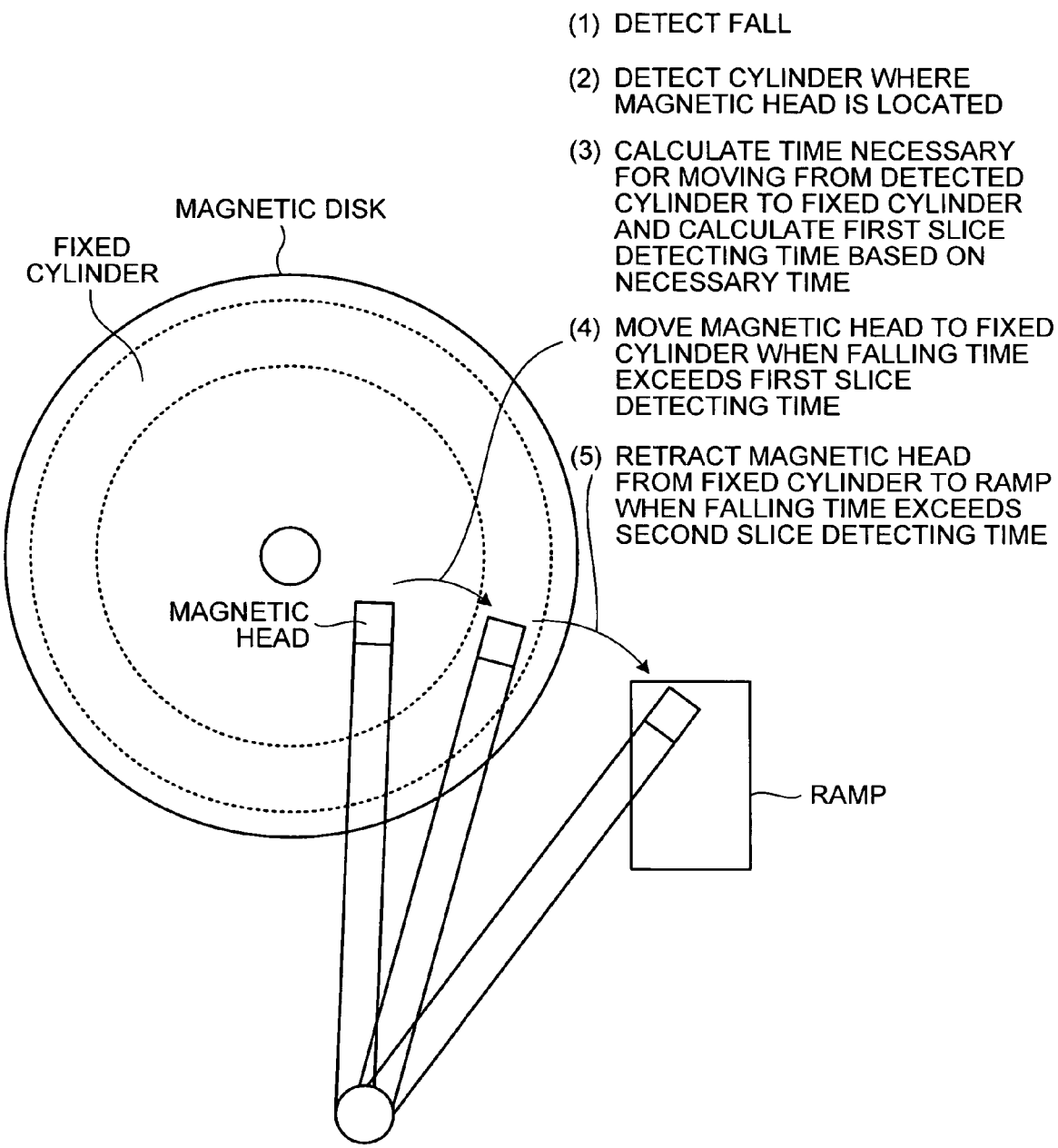
FIG. 1 is a schematic diagram for explaining an outline and features of a magnetic disk drive according to a first embodiment of the present invention.

Exemplary embodiments of the present invention will be described in detail with reference to the accompanying drawings. The storage device according to the present embodiment is based on the premise that the storage device is a magnetic disk drive having a magnetic disk as a storage medium and that the storage device includes a ramp mechanism having a slope where a magnetic head that reads and writes data runs on to and retracts away from a magnetic disk surface when rotation of the magnetic disk halts. Especially, since the magnetic head retracted to the ramp mechanism is loaded to the magnetic disk, the ramp mechanism is called a ramp load mechanism. The ramp mechanism hereinafter is simply referred to as a ramp. In the embodiments below, both of a fixed cylinder and the ramp mechanism are destination positions of the magnetic head.

The storage medium is not limited to a magnetic disk and may be a storage device that magnetically or optically reads and writes data to and from a storage medium such as a magneto-optical disk.

A first embodiment of the present invention is an embodiment that retracts the magnetic head from a predetermined cylinder position (hereinafter, "fixed cylinder") to the ramp after temporarily moving the magnetic head to the fixed cylinder that exists on a periphery of the magnetic disk when a fall of the storage device is detected.

However, according to the present embodiment, the magnetic head is not immediately moved to the fixed cylinder or retracted to the ramp when a fall of the storage device is detected, but moves the magnetic disk to the fixed cylinder when a time from the detection of the fall of the storage device becomes greater than a first predetermined value (hereinafter, "first slice detecting time") or exceeds the predetermined value, and retracts the magnetic head to the ramp when a time from the detection of the fall of the storage device becomes greater than a predetermined value as well as a second predetermined value (hereinafter, "second slice detecting time") or exceeds the predetermined value.

Especially, the first slice detecting time according to the first embodiment is variable in accordance with the cylinder position where the magnetic head is located when a fall of the storage device is detected. Specifically, when the magnetic head exists at an inner peripheral of the magnetic disk, a seeking time to the fixed cylinder becomes longer. On the other hand, a time necessary for a retraction from the fixed cylinder to the ramp is constant. Therefore, in consideration of the seeking time to the fixed cylinder, if the first slice detecting time is set shorter when the seeking time is longer, the time from a detection of a fall of the storage device to a completion of the movement to the fixed cylinder can be constant regardless of the position of the magnetic disk on the cylinder.

The time from a detection of a fall of the storage device to a retraction of the magnetic head to the ramp can be constant by making the first slice detecting time variable in accordance with the cylinder where the magnetic head is located since the time necessary for a retraction from the fixed cylinder to the ramp is constant. A series of the process that retracts the magnetic head to the ramp after moving the magnetic head to the fixed cylinder in compliance with a detection of a fall of the storage device is hereinafter referred to as a head unloading process.

An outline and features of a magnetic disk drive 100 according to the first embodiment will be described in reference to FIG. 1. FIG. 1 is a schematic diagram for explaining an outline and features of the magnetic disk drive 100 according to the first embodiment. As shown in FIG. 1, after detecting a fall of the magnetic disk drive 100 according to the first embodiment (FIG. 1 (1)), the cylinder where the magnetic head is located is detected (FIG. 1 (2)). A time necessary for moving (seeking time) from the detected cylinder to the fixed cylinder is then calculated, and the first slice detecting time is calculated based on the moving time (FIG. 1 (3)).

The magnetic head is moved from the position at the time of the fall detection to the fixed cylinder when a falling time from the beginning of the fall detection becomes greater than the first slice detecting time or when the falling time exceeds the first slice detecting time (FIG. 1 (4)). The magnetic head is then moved from the fixed cylinder to the ramp when the falling time becomes greater than the second slice detecting time preset with a fixed value or when the falling time exceeds the second slice detecting time (FIG. 1 (5)).

Assume that, in consideration of the time necessary for falling, the retraction of the magnetic head to the ramp must be completed in z millisecond from the start of the fall detection (this time is referred to as guaranteed time (z)), and z=100 milliseconds, first slice detecting time: x=70 milliseconds, second slice detecting time: y=90 milliseconds. z, x, and y are fixed values. Assume also that the time necessary for moving the magnetic head from the fixed cylinder to the ramp is 10 milliseconds.

In this case, for example, if the magnetic disk exists at a location where the seeking time (t1) to the fixed cylinder is 5 milliseconds when detection of a fall started, x+t1=70+5=75 milliseconds is passed when the seeking of the magnetic head to the fixed cylinder is completed. However, since the second slice detecting time is 90 milliseconds, the magnetic head stands by at the fixed cylinder for t2=y−(x+t1)=90−75=15 milliseconds.

The time t2=y−(x+t1) of the magnetic head standing by at the fixed cylinder is a variable value that becomes larger when t1 is closer to the fixed cylinder, and since y is a fixed value, if x is a fixed value, then t2 is inevitably a variable value. The magnetic head may stand by at the fixed cylinder since t2 differs depending on the location of the magnetic head at the beginning of the detection of a fall, and this fact detracts the prompt head unloading process of the magnetic head.

The present invention is intended to overcome the problem, and if x is variable in accordance with t1 and x is set to be variable such that the t2 becomes 0 as a result, the magnetic head can be retracted to the ramp right after the magnetic head is sought to the fixed cylinder upon the detection of a fall of the storage device. Therefore, the head unloading process of the magnetic head can be conducted promptly.

Since z described above is a constant value, if x is set to be variable such that t2=0, then x=y−t1, and the smaller t1 is (i.e., the closer the magnetic head to the fixed cylinder) the greater x is, therefore, the time from the detection of a fall of the storage device to the beginning of the head unloading process can be relatively long. Starting of the head unloading process can be ceased when a detected fall is determined to be not an actual fall during the time from the detection of a fall of the storage device to the starting of the head unloading process. Degradation of performance of the reading and writing speeds of the magnetic disk drive 100 according to the first embodiment itself resulted from frequent head unloading processes can be prevented since the starting of the head unloading process can easily be ceased even when falls are erroneously detected due to a minor vibration, etc.

Figure 2:
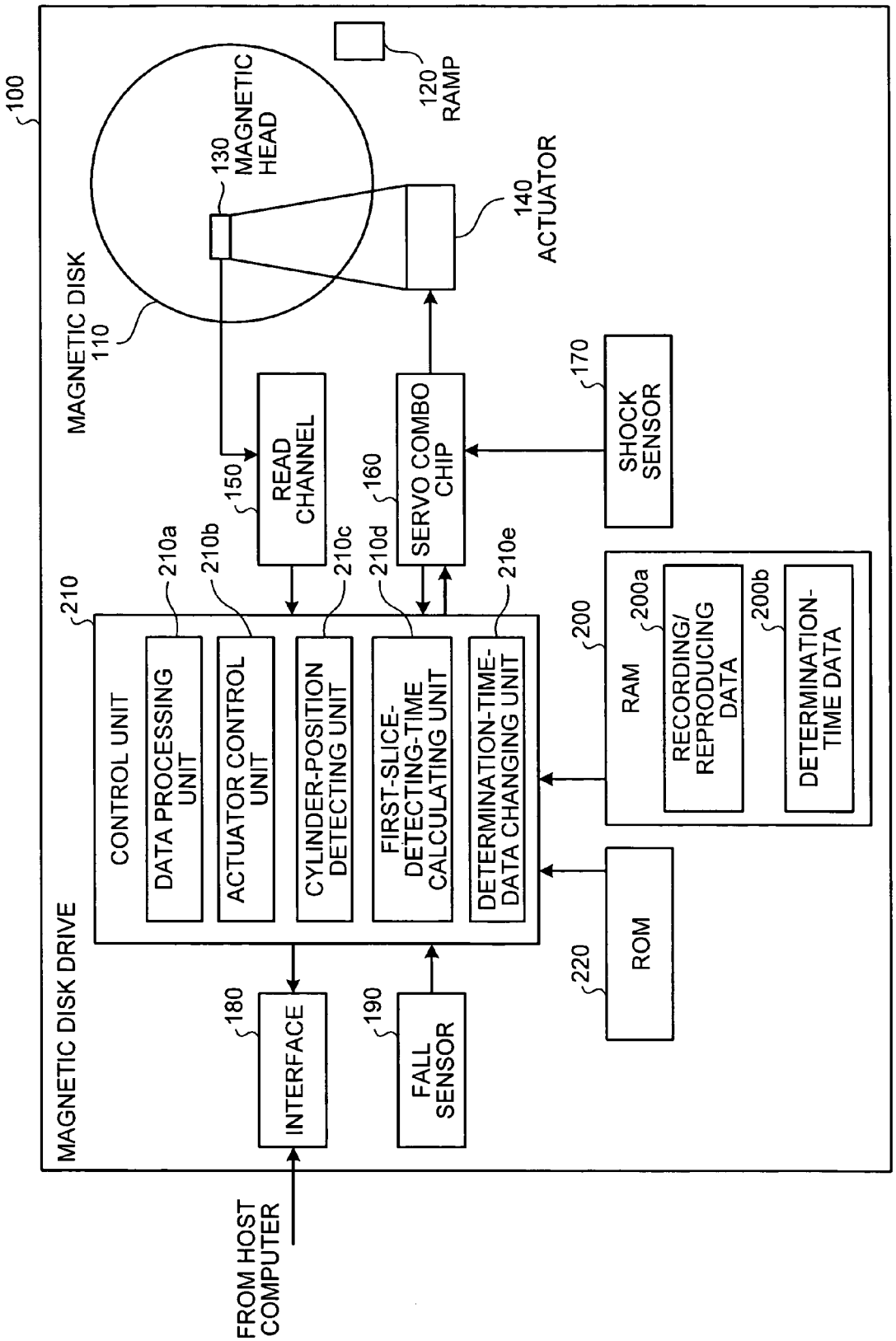
FIG. 2 is a functional block diagram of a configuration of the magnetic disk drive according to the first embodiment.

A configuration of the magnetic disk drive 100 according to the first embodiment will then be described. FIG. 2 is a functional block diagram of the configuration of the magnetic disk drive 100 according to the first embodiment. As shown in FIG. 2, the magnetic disk drive 100 according to the first embodiment includes a magnetic disk 110, a ramp 120, a magnetic head 130, an actuator 140, a read channel 150, a servo combo chip 160, a shock sensor 170, an interface 180, a fall sensor 190, a RAM 200, a control unit 210, and a read only memory (ROM) 220. Other configurations are similar to general magnetic disk drives and therefore will not be described.

The magnetic disk 110 is a recording medium forming a magnetic film on a metal or glass disk-shaped substrate. To record data on the magnetic disk 110, a magnetic field is radiated from the magnetic head to a recording area that records data of the magnetic disk 110, and the magnetization state of the magnetic body on the surface is changed. To read and reproduce the data from the magnetic disk 110, the magnetic head 130 is moved to a recording area on the magnetic disk 110 to be reproduced and the magnetization state of the magnetic body of the magnetic disk 110 is read and the data is reproduced.

A fixed cylinder is provided at the magnetic disk 110 as an unloading cylinder. When the magnetic disk drive 100 according to the first embodiment retracts the magnetic head 130 to the ramp 120, the magnetic disk drive 100 according to the first embodiment first moves the magnetic head 130 to the fixed cylinder provided at the magnetic disk 110 and then retracts the magnetic head 130 to the ramp 120. The distance between the position of the fixed cylinder provided at the magnetic disk 110 and the position of the ramp 120 is maintained constant. The ramp 120 has a slope that a tab at the tip of the magnetic head 130 runs on to when the rotation of the magnetic disk 110 halts. The slope is a mechanism enabling the magnetic head 130 to be retracted apart from the surface of the magnetic disk 110.

The magnetic head 130 is a device that records and reproduces data to and from the magnetic disk 110. The magnetic head 130 also reads servo information that manages a track position, etc., from the magnetic disk 110 and outputs the servo information along with reproduction data reproduced from the magnetic disk 110 to the read channel 150.

The servo information is information that is recorded to the magnetic disk 110 along with data. The servo information includes information of the track position and track-by-track information as well as information for determining the position of the cylinder.

The actuator 140 is a device that has a voice coil motor (VCM) and that moves the magnetic head 130 by a control current outputted from the servo combo chip 160. The read channel 150 is a device that acquires reproduction data and servo information from the magnetic head 130 and that outputs the acquired reproduction data and servo information to the control unit 210.

The servo combo chip 160 is a device that outputs the control current to the actuator 140 in accordance with an instruction from the control unit 210 and that controls movement of the magnetic head 130. The servo combo chip 160 also applies the control current to a spindle motor not shown and controls rotation of the magnetic disk 110.

The shock sensor 170 is a sensor that detects a shock given to the magnetic disk drive 100 according to the first embodiment. The shock sensor also outputs information related to the detected shock to the control unit 210 through the servo combo chip 160.

The interface 180 is a device that controls communications with a host computer not shown. The fall sensor is a sensor that detects falls of the magnetic disk drive 100 according to the first embodiment in the all x-y-z three axis directions and that outputs, to the control unit 210, falling information indicative of information whether the magnetic disk drive 100 according to the first embodiment is falling.

The fall sensor 190 may be a sensor that detects not only the falls but also the acceleration applied to the magnetic disk drive 100 according to the first embodiment. In other words, the fall sensor 190 may detect all predictable conditions that cause shocks by detecting not only the falls but also throws in the horizontal direction and throws upward in the vertical direction.

The RAM 200 is a device that stores data necessary for various processes by the control unit 210, and particularly, the RAM 200 deeply related to the first embodiment stores recording/reproducing data 200a and determination-time data 200b.

The recording/reproducing data 200a is data acquired from the host computer that is to be recorded in the magnetic disk 110 or data reproduced from the magnetic disk 110. The magnetic disk drive 100 according to the first embodiment temporarily stores the data to be recorded in the magnetic disk 110 and the data to be read from the magnetic disk 110 to the RAM 200.

The determination-time data 200b includes a first threshold (hereinafter, "first slice detecting time") that determines whether to move the magnetic head 130 to the fixed cylinder and second threshold (hereinafter, "second slice detecting time") that determines whether to retract the magnetic head 130 to the ramp 120. FIG. 3 is a view of one example of the determination-time data 200b. The slice indicates a very little time.

The magnetic head 130 is moved to the fixed cylinder on the surface of the magnetic disk 110 when a falling time (i.e., an elapsed time from the detection of a fall) of the magnetic disk drive 100 according to the first embodiment becomes greater than the first slice detecting time of FIG. 3 or when the falling time exceeds the first slice detecting time. The magnetic head 130 is retracted from the fixed cylinder to the ramp 120 when the falling time of the magnetic disk drive 100 according to the first embodiment becomes greater than the second slice detecting time of FIG. 3 or when the falling time exceeds the second slice detecting time.

The guaranteed time (z) differs in accordance with the guaranteed falling distance. Considering the acceleration due to gravity of falls, a guaranteed time of 160 milliseconds corresponds to a guaranteed falling distance of 15 cm, for example. If the magnetic disk drive is configured so that the retraction of the magnetic head 130 completes within 160 milliseconds from the fall detection, the falling distance that guarantees damage prevention of the magnetic disk 110 by the magnetic head 130 due to a fall is at least 15 cm. In other words, damage prevention of the magnetic disk 110 by the magnetic head 130 due to a fall is guaranteed for a fall with distance of more than 15 cm.

The first slice time is calculated by subtracting from the guaranteed time (z) a time necessary to move the magnetic head 130 from the fixed cylinder to the ramp 120, a second slice detecting time that is a preset fixed value, and a time necessary to move the magnetic head 130 from the cylinder located at the time of the fall detection to the fixed cylinder. The first slice time is a variable value since the time necessary to move the magnetic head 130 from the cylinder located at the time of the fall detection to the fixed cylinder is a variable value.

The control unit 210 is a device that conducts various processes using control programs and control data that provide procedures of the various processes stored in the ROM 220. Particularly, the control unit 210 deeply related to the first embodiment includes a data processing unit 210a, an actuator control unit 210b, a cylinder-position detecting unit 210c, a first-slice-detecting-time calculating unit 210d, and a determination-time-data changing unit 210e.

The data processing unit 210a is a processing unit that records data acquired from the host computer to the recording/reproducing data 200a and that acquires data (data reproduced from the magnetic disk 110, etc.) from the recording/reproducing data complying with a request from the host computer and outputs the data to the host computer.

The actuator control unit 210b is a processing unit that outputs a control command to the servo combo chip 160 causing the magnetic head 130 to move to a predetermined position. Specifically, the actuator control unit 210b acquires falling information from the fall sensor 190 and moves the magnetic head 130 to the fixed cylinder when the falling time of the magnetic disk drive 100 according to the first embodiment becomes greater than the first slice detecting time or when the falling time exceeds the first slice detecting time. The actuator control unit 210b retracts the magnetic head 130 to the ramp 120 when the falling time of the magnetic disk drive 100 according to the first embodiment becomes greater than the second slice detecting time or when the falling time exceeds the second slice detecting time.

The actuator control unit 210b also moves the magnetic head 130 to the predetermined position on the magnetic disk 110 when data recording or reproducing to and from the magnetic disk 110 is conducted.

The cylinder-position detecting unit 210c is a processing unit that reads, from the servo information of the magnetic disk 110, the position of the cylinder where the magnetic head 130 is located at the time of the fall detection by the fall sensor 190.

The first-slice-detecting-time calculating unit 210d is a processing unit that calculates, based on the time necessary to move the magnetic head 130 from the cylinder position read by the cylinder-position detecting unit 210c to the fixed cylinder (t1), the first slice detecting time (x) by subtracting, from the guaranteed time (z), the time necessary to move the magnetic head 130 from the fixed cylinder to the ramp 120 (t3) and t1 mentioned above. In other words, the first slice detecting time x is calculated by x=z−t3−t1=y−t1, provided that y=z−t3.

The determination-time-data changing unit 210e is a processing unit that updates the first slice detecting time of the determination-time data 200b of the RAM 200 with the first slice detecting time calculated by the first-slice-detecting-time calculating unit 210d.

The determination-time data 200b shown in FIG. 2 will then be described. FIG. 3 is a schematic diagram of an example of the determination-time data 200b shown in FIG. 2. The units of both of the first slice detecting time and the second slice detecting time of FIG. 3 are milliseconds. As described above, the first slice detecting time is a variable value based on the cylinder position at the time of the fall detection. The second slice detecting time (y) is a fixed value externally preset to the magnetic disk drive 100 according to the first embodiment and preferably equals to z−t3. The determination-time data 200b may provide a circuit that automatically calculates the guaranteed time (z) within the magnetic disk drive 100 according to the first embodiment when a guaranteed falling distance is externally set to the magnetic disk drive 100 according to the first embodiment. The guaranteed time (z) may also be externally set to the magnetic disk drive 100 according to the first embodiment in a direct manner.

Figure 4:
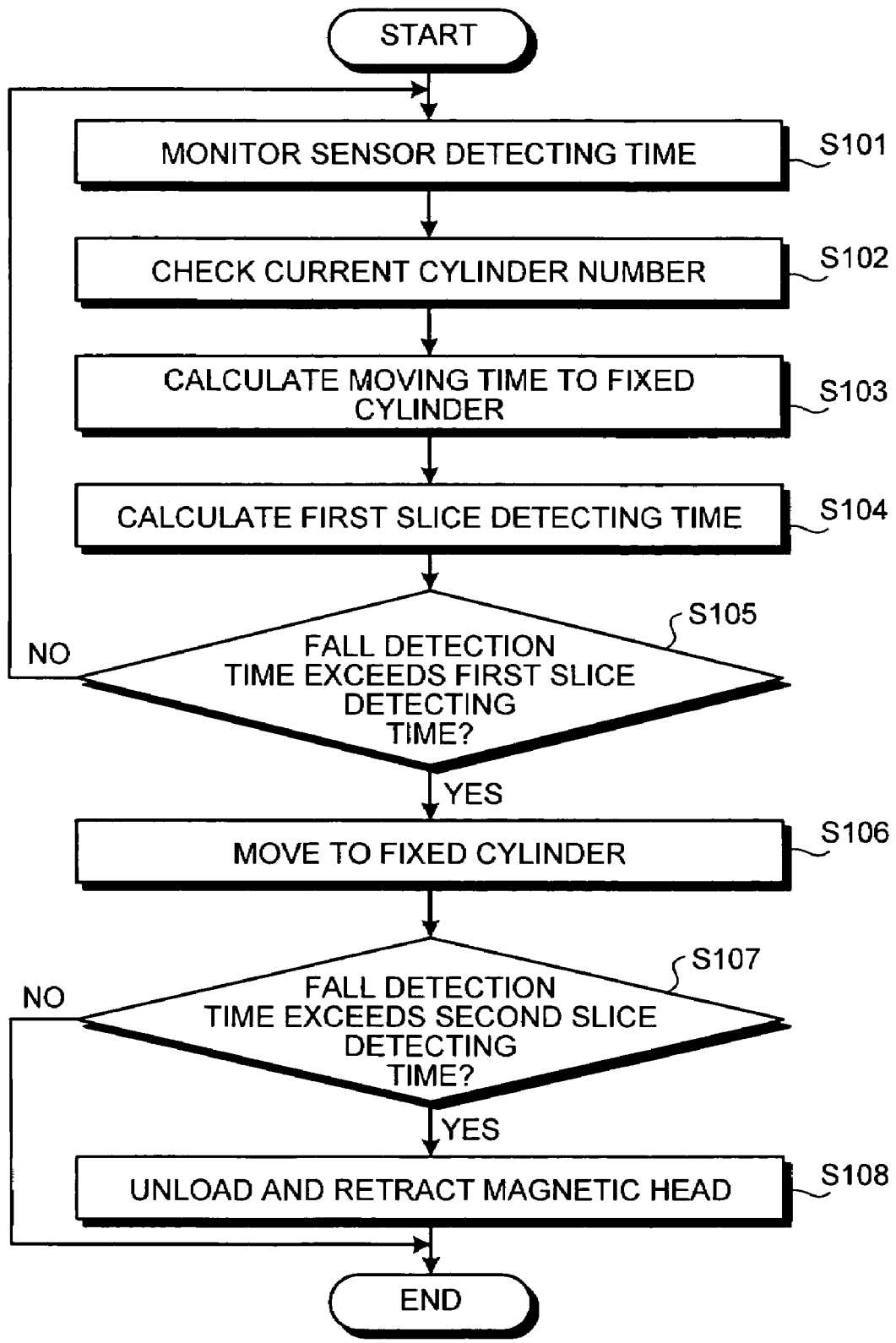
FIG. 4 is a flowchart of a processing procedure for a head unloading process of the magnetic disk dive according to the first embodiment.

A head unloading procedure of the magnetic disk drive according to the first embodiment shown in FIG. 2 will then be described. FIG. 4 is a flowchart of a processing procedure for a head unloading process of the magnetic disk drive 100 according to the first embodiment. As shown in FIG. 4, whether the fall sensor 190 detected a fall is monitored first (step S101). This monitoring is conducted by detecting a pulse that indicates that the fall sensor 190 outputted a fall signal at a sampling of a predetermined cycle, and the monitoring measures time for which the pulse is detected at consecutive samplings, i.e., a fall detecting time.

After detection of a fall at step S101, a cylinder number where the magnetic head 130 is currently located is checked (step S102) and the time necessary to move to the fixed cylinder is calculated (step S103). The first slice detecting time is calculated based on the calculated time necessary for moving (step S104).

Whether the fall detecting time becomes greater than the first slice detecting time or the fall detecting time exceeds the first slice detecting time is then determined (step S105). When the fall detecting time is determined to be greater than the first slice detecting time or exceeds the first slice detecting time (step S105, Yes), the magnetic head 130 is moved to the fixed cylinder (step S106), and when the fall detecting time is not determined to be greater than the first slice detecting time or exceeds the first slice detecting time (step S105, No), the process returns to step S101.

Subsequent to step S106, whether the fall detecting time becomes greater than the second slice detecting time or the fall detecting time exceeds the second slice detecting time is determined (step S107). When the fall detecting time is determined to be greater than the second slice detecting time or exceeds the second slice detecting time (step S107, Yes), the magnetic head 130 is unloaded and retracted to the ramp 120 (step S108), and when the fall detecting time is not determined to be greater than the second slice detecting time or exceeds the second slice detecting time (step S107, No), the head unloading process is terminated.

Most efficient head unloading process can always be possible because by conducting processes of steps S102 to S104 each time a fall of the storage device is detected, the position of the cylinder where the magnetic head 130 is located is figured out at the timing of the detection, and the optimal first slice detecting time is calculated based on the cylinder position.

According to the first embodiment, a configuration and a controlling method are illustrated that move the magnetic disk to the fixed cylinder first and then retract to the ramp mechanism when a fall of the storage device is detected. In this case, the time from the fall detection to the beginning of the retraction process (i.e., first slice detecting time) is varied in accordance with the seeking time from the cylinder where the magnetic head is located when the fall is detected to the fixed cylinder. However, the configuration and the controlling method are not limited to this, and the magnetic head may be directly retracted to the ramp mechanism when the fall of the storage device is detected. In this case, the time from the fall detection to the beginning of the retraction process (i.e., first slice detecting time) is also varied in accordance with the seeking time from the cylinder where the magnetic head is located when the fall is detected to the ramp.

A second embodiment of the present invention is an embodiment where a plurality of fixed cylinders (two in the second embodiment) according to the first embodiment are present, and the second embodiment is an embodiment that first seeks the magnetic head to a predetermined first fixed cylinder existing more outward when a fall of the storage device is detected, then seeks the magnetic head to a second fixed cylinder existing further outward, and the second embodiment retracts the magnetic head from the second fixed cylinder to the ramp. The second embodiment is similar to the first embodiment other than this point, and especially, since the functional blocks of the magnetic disk drive are the same, the same configuration function as the first embodiment will not be described and only the points where the differences exist will be explained.

Figure 5:
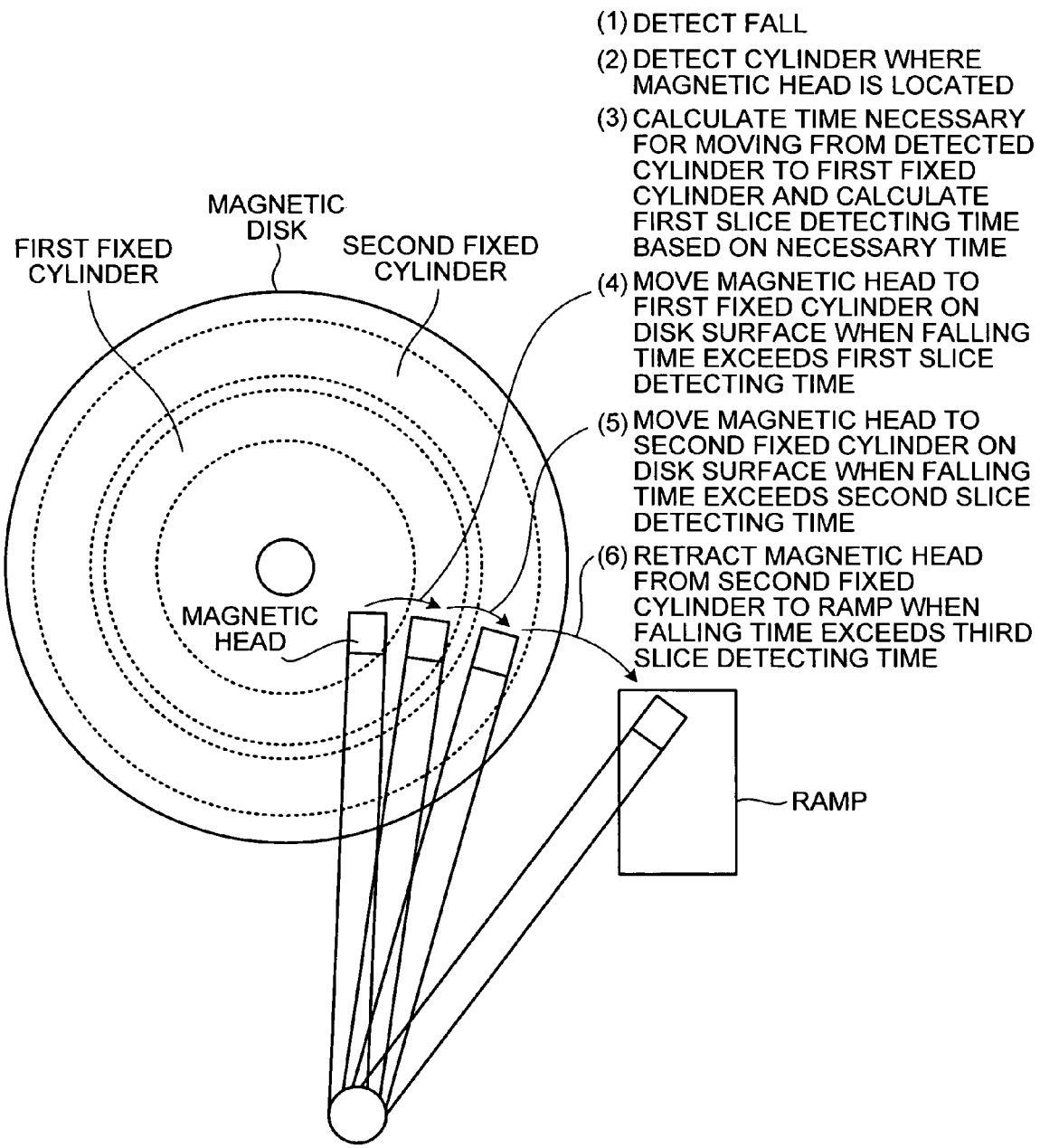
FIG. 5 is a schematic diagram for explaining an outline and features of a magnetic disk drive according to a second embodiment of the present invention.

An outline and features of a magnetic disk drive 100 according to the second embodiment will now be described. FIG. 5 is a schematic diagram for explaining an outline and features of the magnetic disk drive 100 according to the second embodiment. As shown in FIG. 5, after detection of a fall of the magnetic disk drive that is the storage device (FIG. 5 (1)), a cylinder where the magnetic head is located is detected (FIG. 5 (2)). A time necessary for moving (seek time) from the detected cylinder to the first fixed cylinder is then calculated, and a first slice detecting time is calculated based on the time necessary (FIG. 5 (3)).

The magnetic head is moved from the position at the time of the fall detection to the fixed cylinder when a falling time from the beginning of the fall detection becomes greater than the first slice detecting time or when the falling time exceeds the first slice detecting time (FIG. 5 (4)). After the magnetic head is moved to the first fixed cylinder, the magnetic head is moved from the first fixed cylinder to the second fixed cylinder when the falling time from the beginning of the fall detection becomes greater than the second slice detecting time that is preset with a fixed value or when the falling time exceeds the second slice detecting time (FIG. 5 (5)).

The magnetic head is lastly moved from the second fixed cylinder to the ramp when the falling time becomes greater than a third slice detecting time preset with a fixed value or when the falling time exceeds the third slice detecting time (FIG. 5 (6)).

The first slice detecting time is a variable value that corresponds to the cylinder position where the magnetic disk exists at the time of the fall detection, similar to the first slice detecting time according to the first embodiment. According to the relationship of the guaranteed time (z), the second slice detecting time (y1), the third slice detecting time (y2), the time necessary to move the magnetic head 130 from the cylinder position where the magnetic head exists at the time of the fall detection to the first fixed cylinder (t1), the time necessary to move the magnetic head 130 from the first fixed cylinder to the second fixed cylinder (t3), and the time necessary to move the magnetic head 130 from the second cylinder to the ramp 120 (t4), the first slice detecting time x is calculated by $x=z-t4-t3-t1=y2-t3-t1=y1-t1$, provided that $y2=z-t4$ and $y1=y2-t3$.

When a plurality of destination positions of the magnetic head exist in the process of retracting the magnetic disk to the ramp, a plurality of opportunities can be set to halt midway through the processes of retracting the magnetic head to the ramp mechanism, and unnecessary movements of the magnetic head can be prevented in advance and efficient magnetic head retraction processes can be possible, preventing the decrease in disk reading/writing speeds.

The magnetic head is retracted to the ramp mechanism when a time measured by a falling-time measuring unit is determined to be greater than the third slice detecting time, and since the distance between the outermost fixed cylinder and the ramp mechanism is constant and the time necessary to move the magnetic head is constant, the speed of the retraction of the magnetic head to the ramp mechanism does not have to be unnecessarily high, reducing the burden of abrasion of the ramp mechanism.

The determination-time data 200*b* according to the second embodiment will then be described. FIG. 6 is a schematic diagram of an example of the determination-time data 200*b* according to the second embodiment. The units of the first slice detecting time, the second slice detecting time, and the third slice detecting time are all milliseconds. As described above, the first slice detecting time is a variable value based on the cylinder position at the time of the fall detection. The second slice detecting time (y1) and the third slice detecting time (y2) are fixed values externally preset to the magnetic disk drive 100 according to the second embodiment and preferably equal to $y2-t3$ and $z-t4$, respectively. The determination-time data 200*b* may provide a circuit that automatically calculates the guaranteed time (z) within the magnetic disk drive 100 according to the second embodiment when a guaranteed falling distance is externally set to the magnetic disk drive 100 according to the second embodiment. The guaranteed time (z) may also be externally set to the magnetic disk drive 100 according to the second embodiment in a direct manner.

Figure 7:
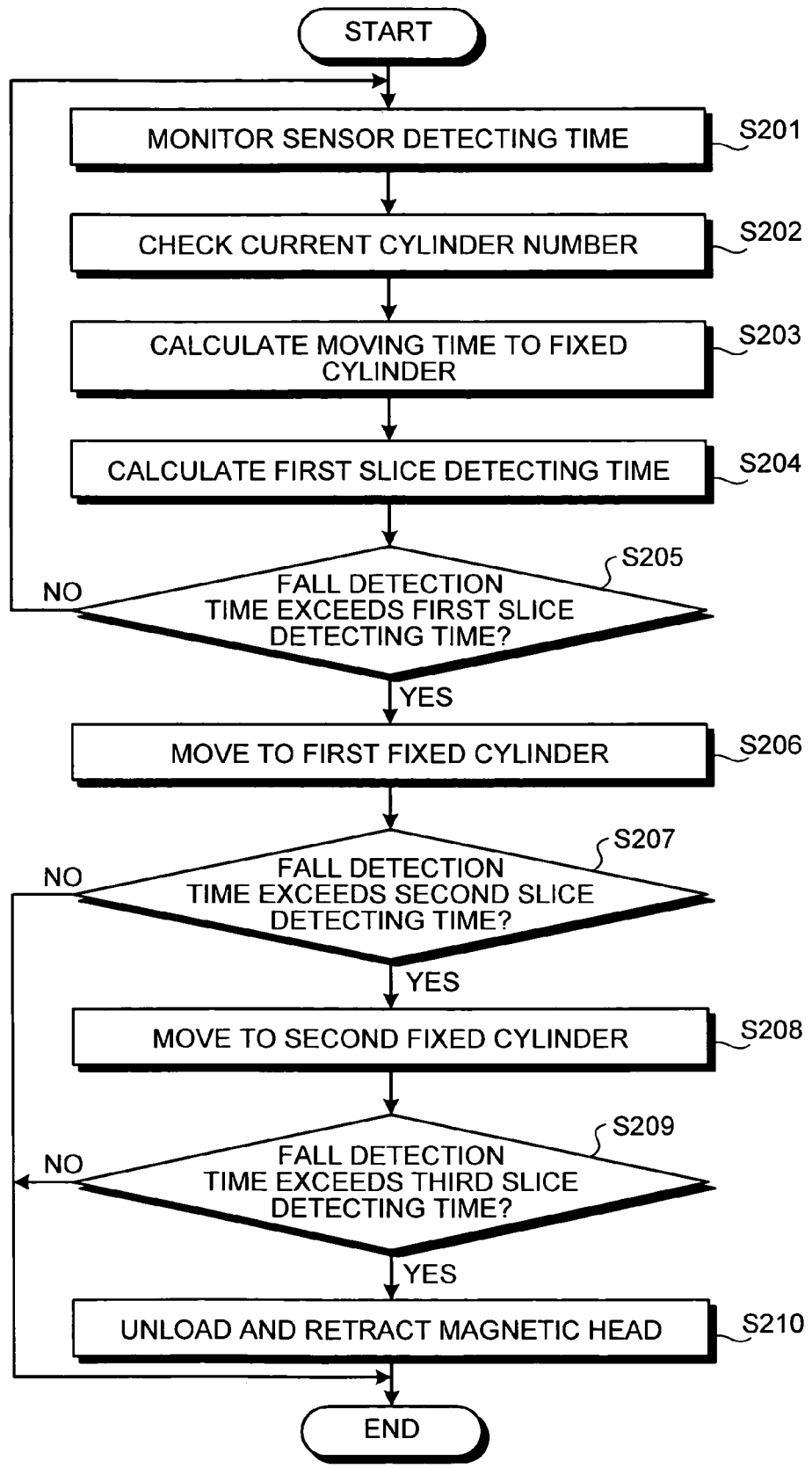
FIG. 7 is a flowchart of a processing procedure for a head unloading process of the magnetic disk drive according to the second embodiment.

A head unloading procedure of the magnetic disk drive 100 according to the second embodiment will then be described. FIG. 7 is a flowchart of a processing procedure for a head unloading process of the magnetic disk drive 100 according to the second embodiment. As shown in FIG. 7, whether the fall sensor 190 detected a fall is monitored first (step S201). This monitoring is conducted by detecting a pulse that indicates that the fall sensor 190 outputted a fall signal at a sampling of a predetermined cycle, and the monitoring measures time for which the pulse is detected at consecutive samplings, i.e., a fall detecting time.

After detection of a fall at step S201, a cylinder number where the magnetic head 130 is currently located is checked (step S202) and the time necessary to move to the fixed cylinder is calculated (step S203). The first slice detecting time is calculated based on the calculated time necessary for moving (step S204).

Whether the fall detecting time becomes greater than the first slice detecting time or the fall detecting time exceeds the first slice detecting time is then determined (step S205). When the fall detecting time is determined to be greater than the first slice detecting time or exceeds the first slice detecting time (step S205, Yes), the magnetic head 130 is moved to the fixed cylinder (step S206), and when the fall detecting time is not determined to be greater than the first slice detecting time or exceeds the first slice detecting time (step S205, No), the process returns to step S201.

Subsequent to step S206, whether the fall detecting time becomes greater than the second slice detecting time or the fall detecting time exceeds the second slice detecting time is determined (step S207). When the fall detecting time is determined to be greater than the second slice detecting time or exceeds the second slice detecting time (step S207, Yes), the magnetic head 130 is moved to the second fixed cylinder (step S208), and when the fall detecting time is not determined to be greater than the second slice detecting time or exceeds the second slice detecting time (step S207, No), the head unloading process is terminated.

Subsequent to step S208, whether the fall detecting time becomes greater than the third slice detecting time or the fall detecting time exceeds the third slice detecting time is determined (step S209). When the fall detecting time is determined to be greater than the third slice detecting time or exceeds the third slice detecting time (step S209, Yes), the magnetic head 130 is unloaded and moved to the ramp 120 (step S210), and when the fall detecting time is not determined to be greater than the third slice detecting time or exceeds the third slice detecting time (step S209, No), the head unloading process is terminated.

Since whether the fall detecting time exceeds a predetermined threshold is determined such as at steps S205, S207, and S209 and a plurality of opportunities are provided enabling the termination of the head unloading process when the determination result is negative, a plurality of opportunities can be set to halt midway through the processes of retracting the magnetic head to the ramp mechanism, and therefore unnecessary movements of the magnetic head can be prevented in advance and efficient magnetic head retraction processes can be possible, preventing the decrease in reading/writing speeds of the magnetic disk.

Although two fixed cylinders, the first fixed-cylinder and the second fixed cylinder, exist in the second embodiment, it is not limited to this, and more than three fixed cylinders may exist. When a large number of fixed cylinders exist, a large number of interruption timings are to be set, and if a fall is erroneously detected, the head unloading process is interrupted and unnecessary unloading process is abbreviated. Therefore, degradation of the reading and writing performance of the magnetic disk drive can be prevented.

Although the first and the second embodiments are described above, the present invention is not limited to the embodiments, and the present invention can further be implemented by various other embodiments within the technical scope described in the claims. The advantages described in the first and second embodiments also are not limited to these.

The various processes described in the first and the second embodiments above can be realized by executing prepared programs with processing devices such as a central processing unit (CPU), a micro control unit (MCU), or a micro processing unit (MPU), provided at the magnetic disk drive 100 according to the second embodiment. In the example of FIG. 2, various programs realizing the various processes are stored in the ROM 220, and various processes realizing functions of the various processing units (the data processing unit 210a, the actuator control unit 210b, the cylinder-position detecting unit 210c, the first-slice-detecting-time calculating unit 210d, and the determination-time-data changing unit 210e) are activated with the control unit 210 reading and executing the various programs.

The various programs are not necessarily to be stored in the ROM 220 in advance, but can be read from a portable physical storage medium or from an external computer system connected through a network and can be executed by the control unit 210.

As described above, according to an embodiment of the present invention, it is determined whether the falling time of the storage device is greater than the threshold based on the variable threshold calculated in reference to a moving time necessary to move the magnetic head to a predetermined destination position, and the magnetic disk is moved to the destination position only when the determination is positive. Therefore, the optimal first threshold can be figured out based on the magnetic head position that always changes, and starting of the retraction process can be delayed as much as possible and the starting of movement can be avoided when falls are erroneously detected. As a result, the present invention accomplishes successful outcomes of preventing unnecessary movement of the magnetic disk and preventing reduction in reading speed as well as enabling the most effective magnetic head retraction process in terms of processing time. The present invention also accomplishes a successful outcome of improving utility value and convenience of information terminal devices such that a user does not have to worry about influence of vibrations and shakes when the storage device of the present invention is used for the information terminal devices such as a computer system and an electronic appliance.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control apparatus for a storage device that moves a head located on a storage medium surface to a predetermined destination position for a retracting the head when a fall detecting sensor detects a fall of the storage device, the control apparatus comprising:
   a falling-time measuring unit that measures time for which the fall of the storage device is consecutively detected by the fall detecting sensor;
   a head-position detecting unit that detects a position of the head on the storage medium when the falling-time measuring unit starts measuring the time for which the fall of the storage device is consecutively detected;
   a moving-time calculating unit that calculates necessary time for moving the head from the detected position of the head to a first destination position;
   a threshold calculating unit that calculates a first threshold based on the calculated necessary time;
   a first-threshold determining unit that determines whether the measured time is equal to or greater than the calculated first threshold; and
   a first head-movement processing unit that moves the head to the first destination position when the first-threshold determining unit determines that the measured time is equal to or greater than the first threshold.

2. The control apparatus according to claim 1, further comprising:
   a second-threshold determining unit that determines whether the measured time is equal to or greater than a preset second threshold when the head is moved to the first destination position by the first head-movement processing unit; and
   a head-retraction processing unit that retracts the head to a ramp when the second-threshold determining unit determines that the measured time is equal to or greater than the second threshold.

3. The control apparatus according to claim 1, further comprising:
- a second-threshold determining unit that determines whether the measured time is equal to or greater than a preset second threshold when the head is moved to the first destination position by the first head-movement processing unit; and
- a second head-movement processing unit that further moves the head to a second destination position located at more outward location of the storage medium than the first destination position when the second-threshold determining unit determines that the measured time is equal to or greater than the second threshold.

4. The control apparatus according to claim 3, further comprising:
- a third-threshold determining unit that determines whether the measured time is equal to or greater than a preset third threshold when the head is moved to the second destination position by the second head-movement processing unit; and
- a head-final-movement processing unit that further moves the head to a ramp when the third-threshold determining unit determines that the measured time is equal to or greater than the third threshold.

5. A storage device that moves a head located on a storage medium surface to a predetermined destination position for a retracting the head when a fall detecting sensor detects a fall of the storage device, the storage device comprising:
- a falling-time measuring unit that measures time for which the fall of the storage device is consecutively detected by the fall detecting sensor;
- a head-position detecting unit that detects a position of the head on the storage medium when the falling-time measuring unit starts measuring the time for which the fall of the storage device is consecutively detected;
- a moving-time calculating unit that calculates necessary time for moving the head from the detected position of the head to a first destination position;
- a threshold calculating unit that calculates a first threshold based on the calculated necessary time;
- a first-threshold determining unit that determines whether the measured time is equal to or greater than the calculated first threshold; and
- a first head-movement processing unit that moves the head to the first destination position when the first-threshold determining unit determines that the measured time is equal to or greater than the first threshold.

6. The storage device according to claim 5, further comprising:
- a second-threshold determining unit that determines whether the measured time is equal to or greater than a preset second threshold when the head is moved to the first destination position by the first head-movement processing unit; and
- a head-retraction processing unit that retracts the head to a ramp when the second-threshold determining unit determines that the measured time is equal to or greater than the second threshold.

7. The storage device according to claim 5, further comprising:
- a second-threshold determining unit that determines whether the measured time is equal to or greater than a preset second threshold when the head is moved to the first destination position by the first head-movement processing unit; and
- a second head-movement processing unit that further moves the head to a second destination position located at more outward location of the storage medium than the first destination position when the second-threshold determining unit determines that the measured time is equal to or greater than the second threshold.

8. The storage device according to claim 7, further comprising:
- a third-threshold determining unit that determines whether the measured time is equal to or greater than a preset third threshold when the head is moved to the second destination position by the second head-movement processing unit; and
- a head-final-movement processing unit that further moves the head to a ramp when the third-threshold determining unit determines that the measured time is equal to or greater than the third threshold.

9. A head-retraction control method for a storage device that moves a head located on a storage medium surface to a predetermined destination position for a retracting the head when a fall detecting sensor detects a fall of the storage device, the head-retraction control method comprising:
- measuring time for which the fall of the storage device is consecutively detected by the fall detecting sensor;
- detecting a position of the head on the storage medium when the measuring is started;
- calculating necessary time for moving the head from the detected position of the head to the destination position;
- calculating a first threshold based on the calculated necessary time;
- determining whether the measured time is equal to or greater than the calculated first threshold; and
- moving the head to the destination position when it is determined that the measured time is equal to or greater than the first threshold.

10. The head-retraction control method according to claim 9, further comprising:
- determining whether the measured time is equal to or greater than a preset second threshold when the head is moved to the first destination position; and
- retracting the head to a ramp when it is determined that the measured time is equal to or greater than the second threshold.

11. A computer program product comprising a computer usable medium having computer readable program codes embodied in the medium that when executed cause a computer to execute:
- measuring time for which the fall of the storage device is consecutively detected by the fall detecting sensor;
- detecting a position of the head on the storage medium when the measuring is started;
- calculating necessary time for moving the head from the detected position of the head to the destination position;
- calculating a first threshold based on the calculated necessary time;
- determining whether the measured time is equal to or greater than the calculated first threshold; and
- moving the head to the destination position when it is determined that the measured time is equal to or greater than the first threshold.

12. The computer program product according to claim 11, wherein the computer readable program codes further cause the computer to execute:
- determining whether the measured time is equal to or greater than a preset second threshold when the head is moved to the first destination position; and
- retracting the head to a ramp when it is determined that the measured time is equal to or greater than the second threshold.

* * * * *